Figure 1:
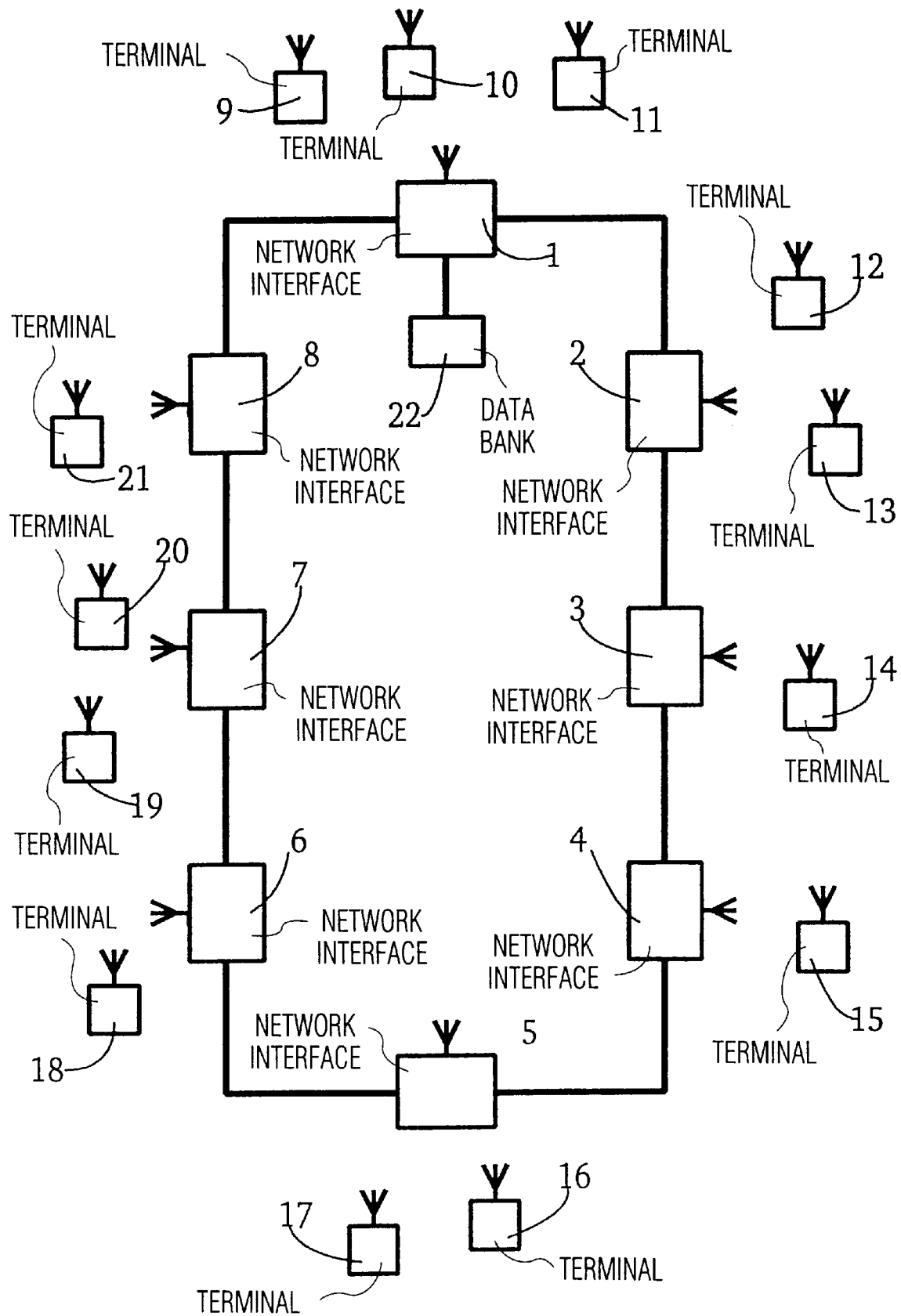

United States Patent
Du et al.

[11] Patent Number: 6,088,346
[45] Date of Patent: Jul. 11, 2000

[54] LOCAL AREA NETWORK WITH TRANSCEIVER

[75] Inventors: Yonggang Du; Peter May; Christoph Herrmann, all of Aachen, Germany

[73] Assignee: U.S. Philips Corporation, New York, N.Y.

[21] Appl. No.: 08/937,313

[22] Filed: Sep. 22, 1997

[30] Foreign Application Priority Data

Sep. 27, 1996 [DE] Germany ............................ 196 39 845

[51] Int. Cl.[7] ................................................. H04L 12/42
[52] U.S. Cl. ............................ 370/338; 370/395; 370/412
[58] Field of Search ....................... 370/338, 395, 370/412

[56] References Cited

U.S. PATENT DOCUMENTS

| | | | |
|---|---|---|---|
| 5,537,399 | 7/1996 | Du ............................................ | 370/58.2 |
| 5,600,795 | 2/1997 | Du ....................................... | 395/200.02 |
| 5,623,495 | 4/1997 | Eng et al. ............................... | 370/397 |
| 5,640,384 | 6/1997 | Du ............................................ | 370/221 |
| 5,787,080 | 7/1998 | Hulyalkar et al. ........................ | 370/348 |

FOREIGN PATENT DOCUMENTS

| | | | |
|---|---|---|---|
| 0641105a2 | 3/1995 | European Pat. Off. ......... | H04L 12/42 |
| 0660567 | 6/1995 | European Pat. Off. .. | |

OTHER PUBLICATIONS

"Computer Networks" by Andrew S. Tanenbaum, Second Edition, Prentice–Hall International, Inc., 1988, pp. 117 to 131, 196 212 and 262 to 265.

"Medium Access Control Protocol for wireless, transparent ATM access", by D. Petras, IEEE Wireless Communication Systems Symposium, Long Island, NY, pp. 79 to 84, Nov. 1995.

*Primary Examiner*—Melvin Marcelo
*Attorney, Agent, or Firm*—Daniel J. Piotrowski

[57] ABSTRACT

The invention relates to a local area network operating in the asynchronous transfer mode, with a first transceiver (1 to 8, 54 to 57) which includes a radio device (33, 60) for transmitting cells to a plurality of other transceivers (1 to 21, 54 to 57). For a data exchange between the first and the other transceivers (1 to 21, 54 to 57) without cells being blocked, a radio device (49, 60) includes a first buffer memory (73) assigned to a respective other transceiver (1 to 21, 54 to 57). A first buffer memory (73) is used for storing a cell whose destination is another transceiver (1 to 21, 54 to 57) which is assigned to the respective first buffer memory (73).

9 Claims, 6 Drawing Sheets

LOCAL AREA NETWORK WITH TRANSCEIVER

DESCRIPTION

The invention relates to a local area network operating in the asynchronous transfer mode, with a first transceiver, which transceiver includes a radio device for transmitting cells to a plurality of other transceivers.

A local area network (LAN) operating in the asynchronous transfer mode is known from EP 0 660 567 A2. This network includes network interfaces which include a radio device for transmitting cells between the individual network interfaces. The cells are transmitted according to a ring principle. A network interface always transmits cells via the ring, ie always to a neighbouring network interface. If necessary, the cells are to be transferred to the destination via a plurality of other network interfaces. For the load-dependent assignment of time slots to the transmission of cells, a circuit element is provided which assigns time slots to the network interfaces.

It is an object of the invention to provide a local area network in which a diversity of requests for services in the radio device becomes possible.

The object is achieved by a local area network of the type defined in the opening paragraph operating in the asynchronous transfer mode, in that the radio device includes first buffer memories assigned to another transceiver and in that a first buffer memory stores a cell whose destination is another transceiver which is assigned to the respective first buffer memory.

In the local area network according to the invention, each transceiver may be a terminal which forms a station and a network interface (adhoc wireless ATM-LAN). The station may be, for example, a videophone, a Personal Computer, a work station or a telephone. A network interface comprises a controller provided at least for setting up a connection and a switching center for switching cells between radio device, station and controller. There is a direct exchange of data between the terminals.

It is also possible for another structure of the local area network to be used. In this structure, the first transceiver is a network interface coupled to a plurality of other network interfaces arranged in a ring (base station oriented wireless ATM-LAN). A network interface includes a controller provided at least for setting up the connection and a switching center for switching cells between ring connections, radio device and controller. The other transceivers form each a terminal which is provided for exchanging data with a network interface. The latter terminals do not have a network interface.

The radio device of the first transceiver includes buffer memories which correspond to the number of other transceivers. A first buffer memory stores all the cells coming from an assigned network interface which are to be transmitted to the transceiver to which the respective first buffer memory is assigned. The assignment of the first buffer memory to the other transceivers avoids that a blocking occurs when there is recurrent transmission of cells, when a certain transceiver is incapable of receiving cells because it is, for example, defective. Furthermore, different transmission rates of the first and other transceivers may be adjusted via different readout rates from the first buffer memories. This achieves, for example, that different requests for services are realized via different buffer memories in the radio device.

Radio transmission is understood to mean that data are transmitted without lines (for example, radio transmission, infrared transmission, ultrasonic transmission).

The radio device comprises a first controller which is used for deleting a cell from a first buffer memory after an acknowledgement of a proper reception from an assigned receiver device. The first controller and the first buffer memory may be assigned to a circuit which executes a function of the LLC layer (LLC=Logical Link Control).

In addition, the first controller is capable of executing a sorting process. In the sorting process, after a cell has been written into a first buffer memory, the first controller is sorts the cells in the respective first buffer memory in dependence on the residual lifetime. The first controller computes the residual lifetime of a cell by subtracting the instant at which the computation takes place and adding the instant at which the storage of the predefined maximum dwell time takes place and releases the reading of the cell that has the shortest residual lifetime from a first buffer memory. On the one hand, this sorting process takes account of the various requests for services and, on the other hand, avoids that cells of a virtual link in the receiver device have to be resorted, because the virtual link cells having the longest dwell time are read out first. The controller does not sort the cells for which an acknowledgement of the reception within a time-out has not yet arrived after the cells have been read from a first buffer memory, or when the waiting period for an acknowledgement has not yet elapsed. The buffer time denotes a period of time in which a cell can still be used to be read out and depends on the respective application. When voice is to be transmitted, the buffer time is usually zero.

The cells read from the first buffer memories are combined and buffered in a second buffer memory. A second controller also carries out a sorting process working with the residual lifetime of the cells buffered in the second buffer memory. The second controller and the second buffer memory are assigned to a circuit which carries out a function of the MAC layer (MAC=Medium Access Control).

The second controller is used for counting the cells to be transmitted to a transceiver and transferred to a control device. The control device in the local area network comprising only terminals with a network interface may be a selected terminal. With the network interfaces connected via a ring, devices of the respective network interfaces form the control device. The control device is used for assigning the number of cells which are to be transmitted from one transceiver to another transceiver.

The invention further relates to a radio device of a first transceiver in a local area network operating in the asynchronous transfer mode for transmitting cells to a plurality of transceivers. Each radio device includes a first buffer memory assigned to another transceiver. A first buffer memory is used for storing a cell whose destination is another transceiver which is assigned to the respective first buffer memory.

These and other aspects of the invention will be apparent from and elucidated with reference to the embodiments described hereinafter.

Figure 2:
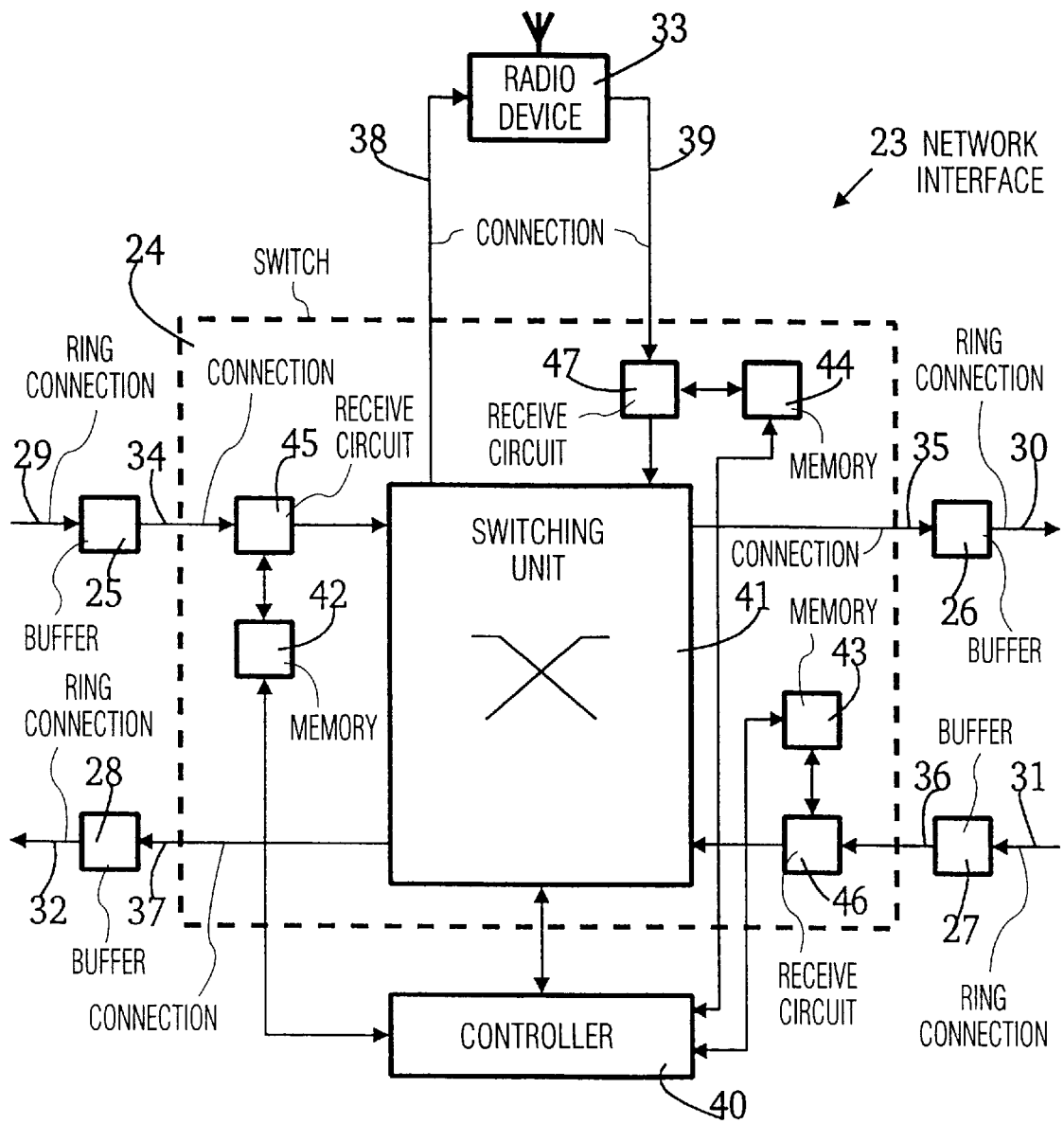
Figure 3:
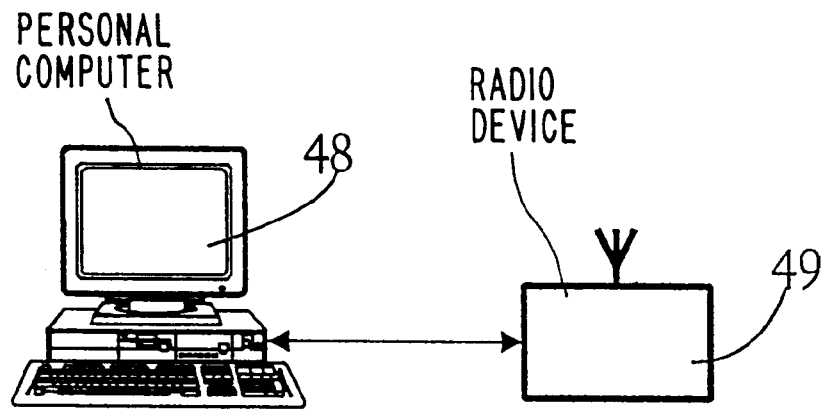
Figure 4:
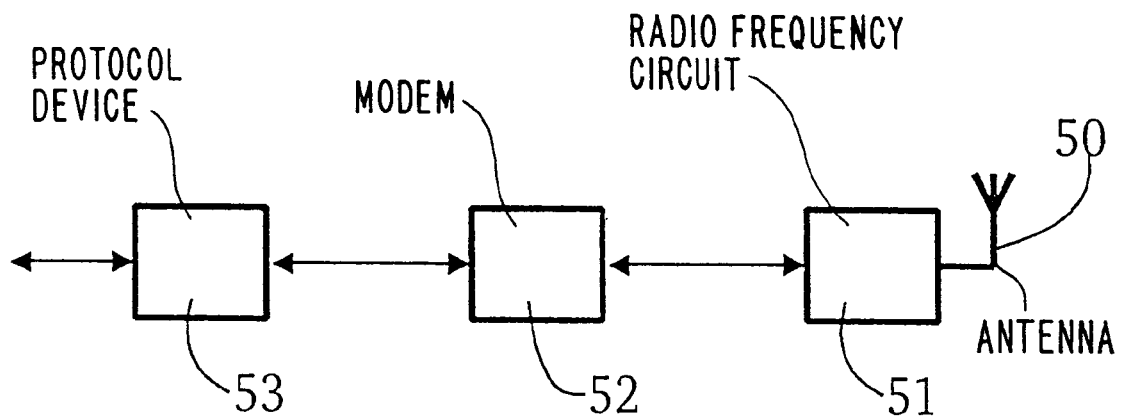
Figure 5:
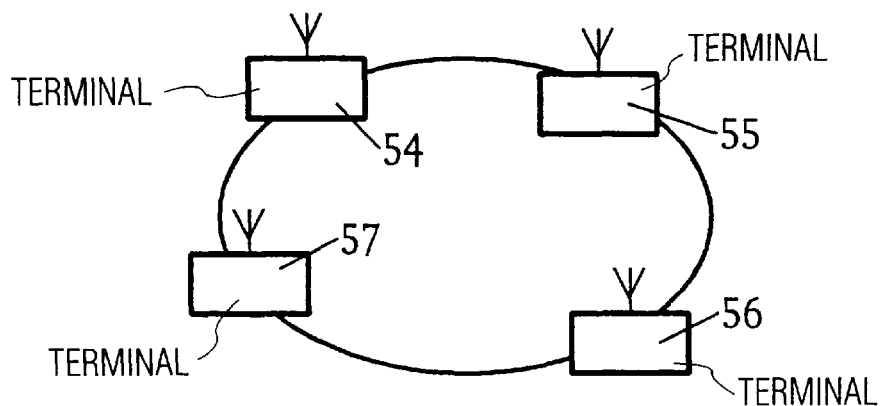
Figure 6:
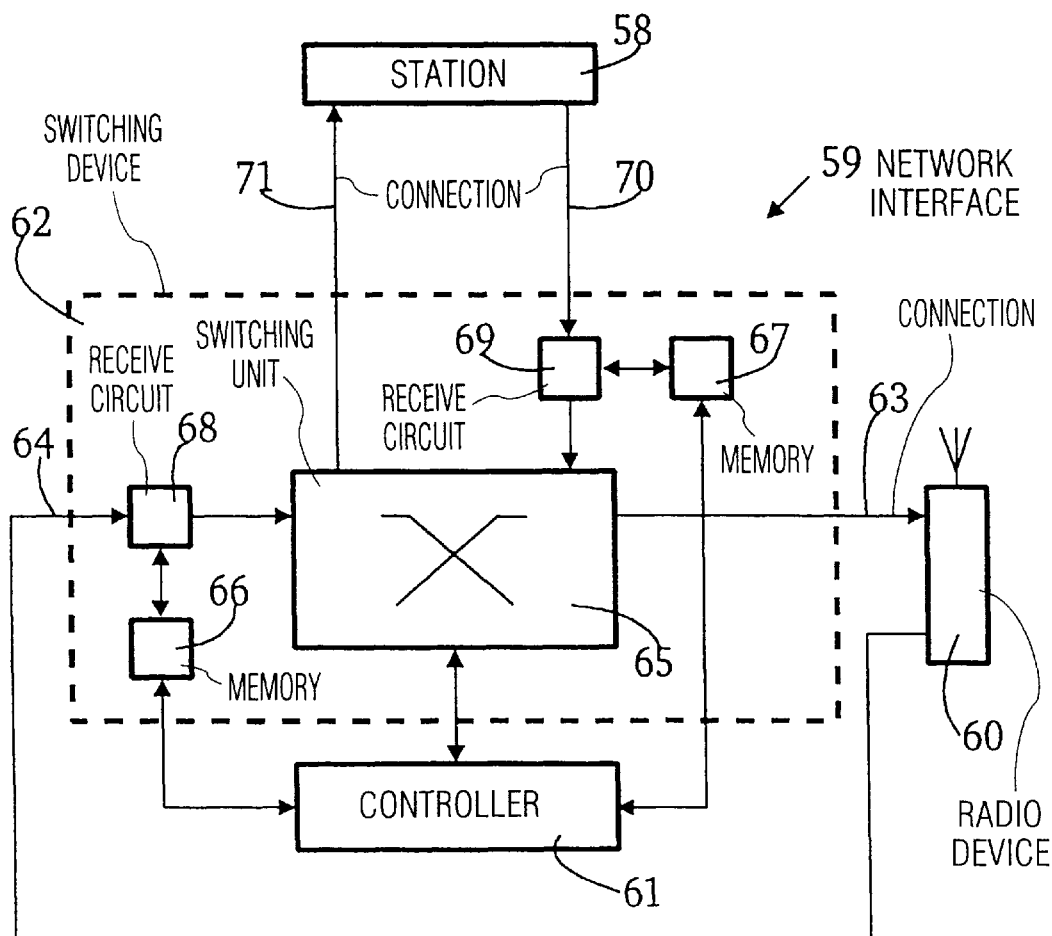
Figure 7:
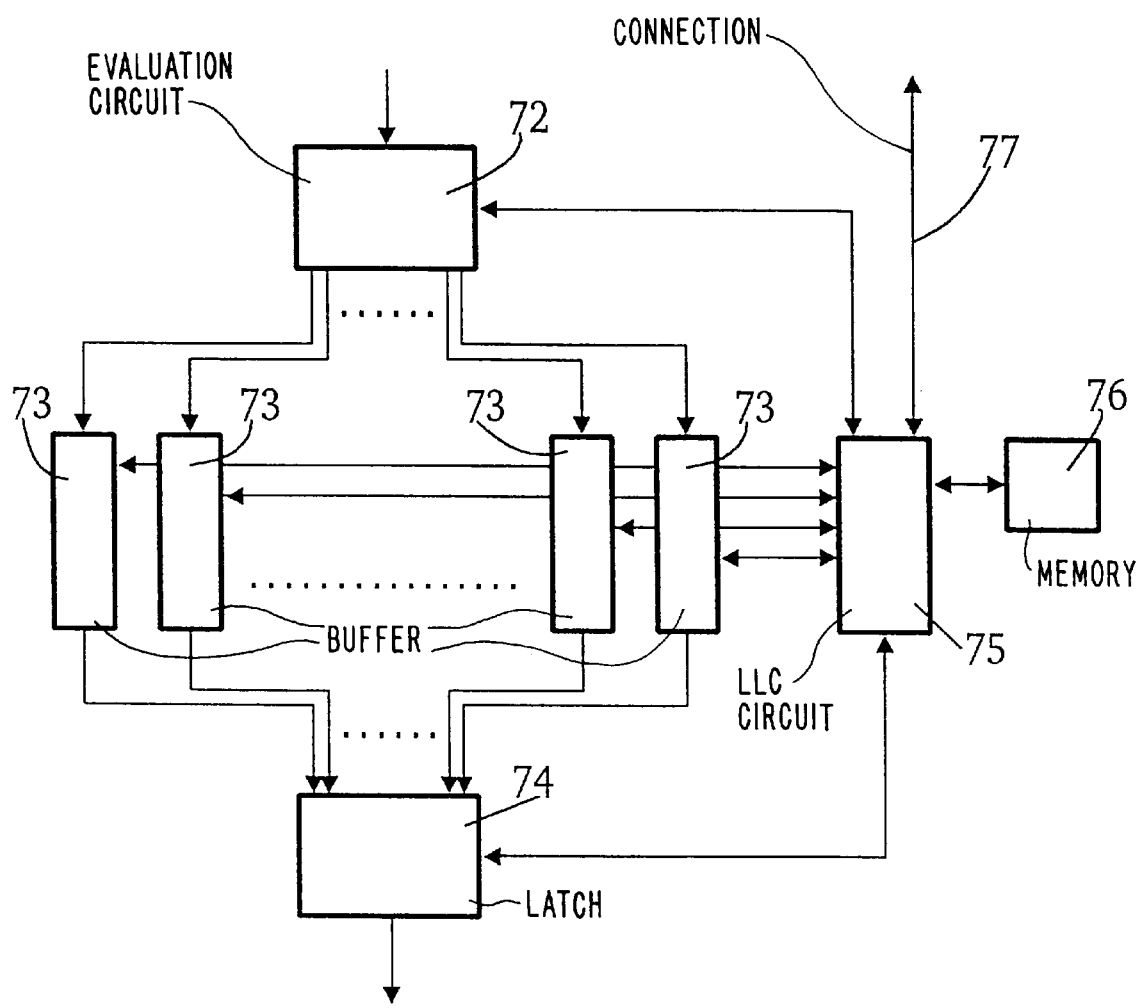
Figure 8:
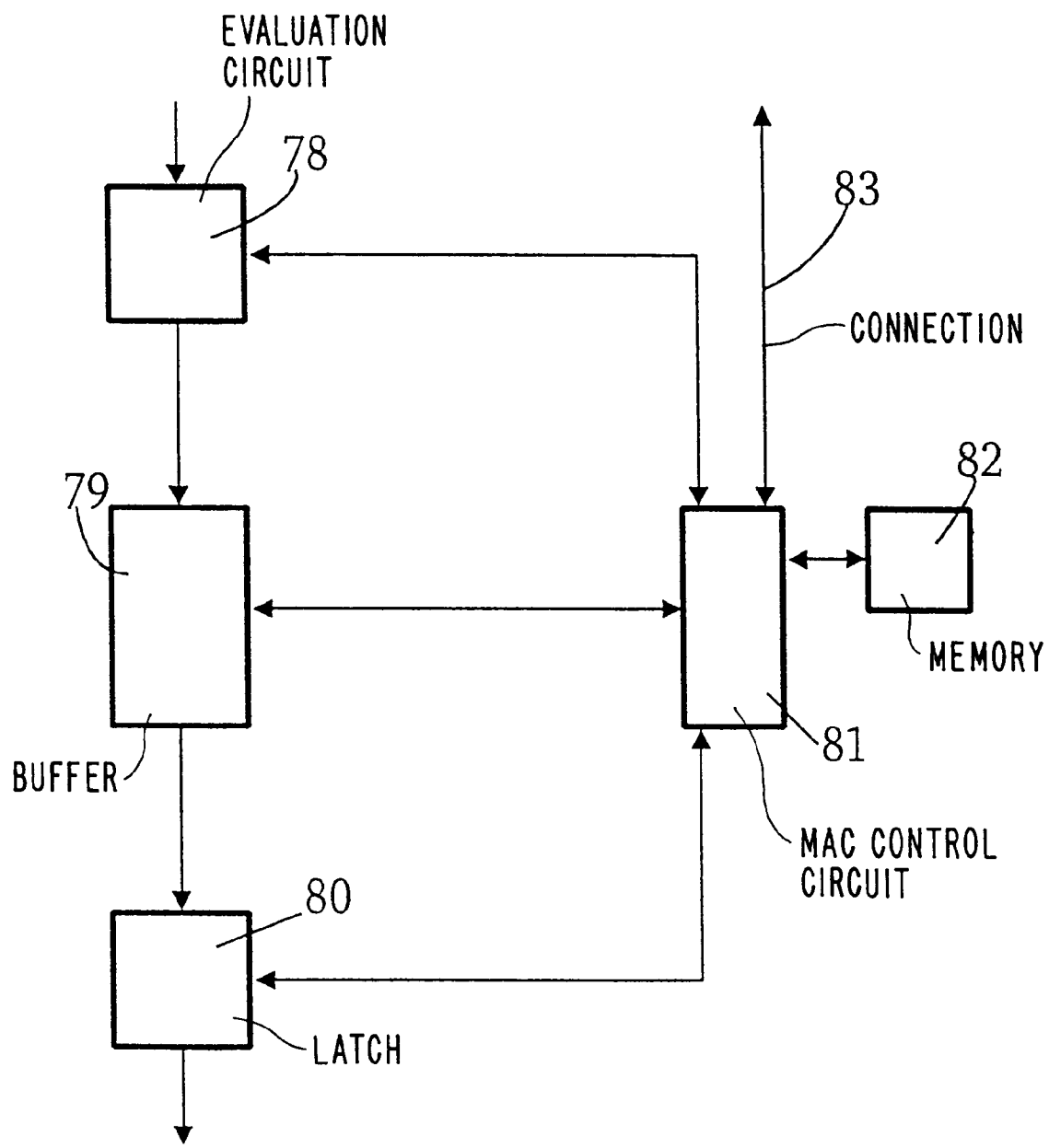

In the drawings:

FIG. 1 shows a local area network,

FIG. 2 shows a network interface to be used in the local area network shown in FIG. 1, FIG. 3 shows a terminal coupled via a radio link to a network interface shown in FIG. 2, FIG. 4 shows a radio device included in a network interface shown in FIG. 2 or in a terminal shown in FIG. 3, FIG. 5 shows a further local area network, FIG. 6 shows a block circuit diagram of a terminal which can be used in the local area network shown in FIG. 5, FIG. 7 shows a circuit included in the radio device shown in FIG. 4 and provided for the function of the LLC layer, and FIG. 8 shows a circuit included in the radio device shown in FIG. 4 and provided for the function of the MAC layer.

FIG. 1 shows an embodiment of a local area network comprising 8 network interfaces 1 to 8 having each at least two ring connections for forming at least one ring. The local area network may also comprise one or various additional rings. When two rings are used, the information may flow through the rings in opposite directions.

Various terminals 9 to 21 are coupled to a network interface 1 to 8 by radio channels. A network interface 1 to 8 and a terminal 9 to 21 include each a radio device for transferring information or messages by the radio channels. In the embodiment shown in FIG. 1, the terminals 9, 10 and 11 are assigned to network interface 1, the terminals 12 and 13 to the network interface 2, the terminal 14 to the network interface 3, the terminal 15 to the network interface 4, the terminals 16 and 17 to the network interface 5, the terminal 18 to the network interface 6, the terminals 19 and 20 to the network interface 7 and the terminal 21 to the network interface 8.

A terminal 9 to 21 includes not only a radio device, but also, for example, a videophone, a personal computer, a workstation or a telephone.

Messages or information are or is transmitted in cells in the asynchronous transfer mode (ATM) between the network interfaces 1 to 8 within the ring. One or a plurality of cells are transmitted by a radio link between the terminals (9 to 21) and the assigned network interfaces (1 to 8). One or various cells are then extended by control indication bytes and additional information (overhead) necessary for the radio transmission.

A cell comprises a header field of, for example, 5 bytes and an information field of, for example, 48 bytes. The information contained in the header field of the cell is especially used for addressing and for executing switch functions.

The network interface 1 is also coupled to a data bank 22 from which, for example, data for a connection set-up can be taken, which data may provide information about the resources of the respective terminals 9 to 21, or about the network topology. The network interface 1 is then additionally provided for managing data and controlling the connection set-up and disconnection.

The radio transmission between a terminal (9 to 21) and an assigned network interface (1 to 8) may be executed according to a TDMA, FDMA or CDMA method (TDMA= Time Division Multiple Access; FDMA=Frequency Division Multiple Access; CDMA=Code Division Multiple Access). The methods may also be combined, as appropriate. For example, according to the TDMA method, a time slot of a frame is assigned to a terminal for a specific connection. The duration of one time slot could correspond to an integral part or to the duration of one or of a multiple of a cell plus additional control indication bytes and auxiliary information necessary for the radio transmission. Different carrier frequencies may be assigned to the network interfaces (1 to 8) and the assigned terminals (9 to 21). The requirements of the respective terminal determine the assignment of a time slot to a connection, for example, during the connection set-up from the network interface 1 and/or per time slot (frame). It is also possible to implement only the TDMA method for the whole local area network. One time slot (sub-frame) of a superframe is then assigned to one network interface.

A network interface 1 to 8 shown in FIG. 1, which forms a part of two oppositely directed rings and will be referenced 23 in the following, is shown in more detail in FIG. 2. In a local area network there may also be used network interfaces which form part of one ring or of more than two rings. The network interface 23 includes a switch 24 which is coupled via buffer memories 25 to 28 to ring connections 29 to 32 and a radio device 33, and switches the cell stream. The radio device 33 is coupled to the switch 24 via the connections 38 and 39.

The buffer memory 25 is coupled, on the one hand, to the receive ring connection 29 of the first ring and, on the other hand, to a connection 34 leading to the switch 24. The buffer memory 25 receives a first receive clock signal which is derived from the cell stream of the receive ring connection 29, and an internal clock signal from a clock generator of the network interface 23. The buffer memory 26 is coupled to the switch 24 by a connection 35 and supplies a cell stream to the transmit ring connection 30 of the first ring. The internal clock signal and a first transmit clock signal which is derived, for example, from the internal clock signal, are applied to the buffer memory 26.

The buffer memory 27 receives a cell stream from the receive ring connection 31 of a second ring, and supplies a cell stream to the switch 24 by a connection 36. The buffer memory 28 receives cells from a connection 37 of the switch 24, which cells are transferred to the transmit ring connection 32 of the second ring. The buffer memory 27 receives not only the internal clock signal, but also a second receive clock signal which is derived from the cell stream of the receive ring connection 31. The internal clock signal and a second transmit clock signal which is derived, for example, from the internal clock signal, are applied to the buffer memory 28.

In the buffer memories 25 to 28, the cell stream is adapted to a clock signal. How various clock signals are derived from the cell stream and how the internal clock signal is generated in the clock generator, is not further shown here.

The network interface 23 further includes a controller 40 controlling the switch 24, which controller is used, for example, for the connection set-up and disconnection. The controller 40, which may be arranged as a microprocessor, receives and generates cells. The switch 24 further includes a switching unit 41, three path memories 42, 43 and 44 and three receive circuits 45, 46 and 47. In the receive circuits 45, 46 and 47 are evaluated the header fields of cells coming in by connections 29, 31 and 39.

Address information contained in the header field is used for activating various Tables for the path memories 42, 43 and 44 connected to the receive circuits 45, 46 and 47. The data stored in the Tables are used by the receive circuits 45, 46 and 47 respectively, for organizing the further processing and transfer of the cell. For example, the receive circuit 45 can copy the cell and provide it with new address information. The original cell is transferred, for example, via the switching unit 41 to the radio device 33 and the copied cell via the switching unit 41 to the buffer memory 26. There is also the possibility for the switching unit 41 to carry out functions such as this copy function.

The receive circuit 45 is coupled to the buffer memory 25 by the connection 34 and transports received cells to the switching unit 41. The path memory 42 is connected to the receive circuit 45. The receive circuit 46, which is connected to the path memory 43, receives cells from the buffer memory 27 and transports cells to the switching unit 41. Between the switching unit 41 and the connection 39 is inserted the receive circuit 47 which is connected to the path memory 44.

Two types of payload cells are transmitted by the ring connections 29 and of the first ring, by the ring connections 31 and 32 of the second ring and by the connections 38 and 39. On the one hand, user cells carrying, for example, messages or user data of a connection previously set up in their information field and, on the other hand, signalling cells carrying overhead bytes in their information field.

Certain bits in the header field of a cell are reserved for the VCI (Virtual Channel Identifier) and for the VPI (Virtual Path Identifier). The VPI indicates a group of virtual links. According to current standardization, 8 bits are reserved for the VPI in the header field of the cell and 16 bits for the VCI.

In this embodiment, the VPI and the VCI together feature a virtual link between at least two users by one number, and the VPI and VCI are determined during the connection set-up. A user is understood to mean, for example, a user of a program in a terminal, another program, stored data (terminal as a databank), or also a telephone subscriber. Additionally, the VPI indicates a group of virtual links. When the connection is set up, certain attributes which are assigned to the connections featured by the VPI and VCI are stored in the Tables of the path memories 42 to 44. An attribute indicates, for example, the type of connection of a virtual link.

A type of connection is a unicast connection, a multicast connection or a broadcast connection. A unicast connection, or end-to-end connection, is a virtual link of a user of a first terminal to a user of a second terminal. A multicast connection, or point-to-multipoint connection, occurs when a plurality of users of terminals are connected to a transmitter terminal. With a broadcast connection, a transmitter terminal delivers cells having the same content in the information field to all other terminals.

A terminal 9 to 21 may comprise, for example, a personal computer 48 and a radio device 49, as shown in FIG. 3. The personal computer 48 exchanges cells with the radio device 49 which is suitable for radio transmission to the associated network interface (1 to 8).

The radio device 33 in the network interface 23 and the radio device 49 in a terminal (9 to 21) comprise an antenna 50, a radio frequency circuit 51, a modem 52 and a protocol device 53 (FIG. 4). Except for the protocol device 53, the other circuit elements 50 to 52 of the radio device 33 and 49 do not need further explanation, because they are circuit elements known from other radio devices. The protocol device 53 forms packet units from the received ATM cell stream, which units contain each at least parts of an ATM cell and control indication bytes and uses error-reducing protocols suitable in a radio transmission medium for the multiple access. These protocols relate to the OSI layer model. The security layer of the OSI layer model is relevant here. It includes at least two further sub-layers: LLC and MAC layers. The MAC (Multiple ACcess) layer controls the multiple access of the terminal to the transmission medium (radio transmission medium). The LLC layer (LLC=Logic Link Control) performs a flow and error check. Further information about the MAC and LLC layer may be obtained, for example, from the title "Computer Networks" by Andrew S. Tanenbaum, Second Edition, Prentice-Hall International, Inc., 1988, pages 117 to 131, 196 to 212 and 262 to 265. Circuitry, which describe functions of the MAC and LLC layers will be further explained below.

In the following, there is assumed that the data exchange between the terminals 9 to 21 and the network interfaces 1 to 8 takes place according to the TDMA and the FDMA methods (Time-Division Multiple Access and Frequency-Division Multiple Access) on the radio path. The network interfaces 1 to 8 and the assigned terminals 9 to 21 transmit data on different carrier frequencies (FDMA). Assigned time slots are used for the transmission of data between a network interface and an assigned terminal (TDMA). A frame includes a channel or time slot (in the following referenced registration channel) containing collisions, a plurality of collision-free MAC signalling channels or time slots for each terminal, and transport channels or transport time slots for payload information. The registration channel may be accessed by each terminal, so that collisions with other terminals may arise. A terminal, once it has switched on, is registered with the assigned network interface over the registration channel. A MAC signalling channel is fixedly assigned to a terminal and is used for exchanging the MAC signalling information between the terminal and the network interface. The MAC signalling information is derived from the protocol assigned to the MAC layer and is used for, for example, dynamically reserving the transport time slot for the payload information. The respective terminal then informs the network interface how many cells are available for transmission in a buffer. For example, the network interface assigns the transport channels to the respective terminals in dependence on the buffer fill of transmit cells of the terminals located in the whole radio coverage area. The assignment is then generally renewed for each new time frame. Also the assignment for all the transport channels may be effected dynamically. This means that in a first frame, more channels are assigned to the transmission from the terminal to the network interface than channels are assigned to the transmission from the network interface to the terminal, and in another frame, more channels are assigned to the transport of cells from the network interface to the terminal than channels are assigned to the transmission from the network interface to the terminal. A method for a MAC signalling may be taken from, for example, the publication "Medium Access Control Protocol for wireless, transparent ATM access" by D. Petras, IEEE Wireless Communication Systems Symposium, Long Island, N.Y., pages 79 to 84, November 1995.

Once a terminal has been put into operation, it sends a registration request containing the identification number (ID number) assigned to the terminal to the assigned network interface (for example, network interface 5) over the registration channel. Once the registration request has been received in the radio device 33, the switch 24 sends this registration request on to the controller 40 after polling the path memory 44. The registration request of the terminal is sent in a signalling cell from the controller 40 of the network interface 5 via the ring to the network interface 1, which interface 1 stores the identification number of the terminal in the databank 22. The reception in the network interface 1 is acknowledged by means of a signalling cell sent to the controller 40 of the network interface and then a further acknowledgement message is returned to the terminal. The terminal not only receives the acknowledgement message, but also the information about the assigned MAC signalling channel.

The controller 40 of a network interface controls the connection set-up and disconnection of users of terminals. Similar control procedures to those described, for example, in European Patent Application EP 0 641 105 A2 are used here too.

In the following, the connection set-up between two users of terminals will be described by way of example. The terminal 18 assigned to the network interface 6 and having a user $A_1$ would like to set up a connection to a user $A_2$ of the terminal 12 assigned to the network interface 2.

There is assumed that the exchange of ATM cells (user and signalling cells) is realized over the radio channel between a terminal and the respective network interface via MAC signalling. The circuit arrangements of the MAC layer make said dynamic time slot assignment possible, irrespective of the contents of the ATM cells.

First, signalling cells containing a connection request are generated by the terminal 18 and transmitted via the network interfaces 6, 7 and 8 to the network interface 1. The controller 40 of the network interface 1 receives signalling cells which contain a connection request and then verifies whether such a connection is possible (for example, verifies whether terminal 12 is registered). If the connection is permitted, a logic number is assigned to this virtual link. This logic number may have a different VPI and a different VCI for the ring and the radio links. A network interface (1 to 8) carries out this conversion. By means of signalling cells, the network interface 1 announces to the controllers 40 of the network interfaces 2 and 6 that a virtual link between the terminals 12 and 18 is set up. Also the VPI and VCI assigned to the virtual link and valid in the ring, and the transmission capacity reserved for the ring are announced. The respective controllers 40 of the network interfaces 2 and 6 are still to verify whether sufficient transmission capacity over the radio channel is available for the virtual link to the respective terminal 12 or 18. Sufficient transmission capacity is to be available on average for the radio channel for a connection. This capacity may vary, however, from one frame to the next. Circuit arrangements of the MAC layer or the controller 40 could be suitable for the dynamic time slot assignment. Over the radio channel, the network interfaces 2 and 6 inform their respective terminals 12 and 18 of the VPI and VCI provided by these for the respective radio channel for the connection. Thus, for the radio channel and the ring there may be assigned a different, but corresponding, VPI and VCI.

Tables in certain path memories are still to be changed in the network interfaces 1 to 8. In the Tables, a certain switch mode is set for the VPI and VCI of the virtual link. This change of Tables is triggered via signalling cells which are transmitted by the network interface 1 and received and evaluated by the controllers 40 of the network interfaces 2 to 8. The actual change of Tables is effected by the controller 40 of each network interface 1 to 8. For this purpose, the VPI and VCI assigned to the radio channel are stored in the path memory 44 and the VPI and VCI assigned to the ring are stored in the path memories 42 and 43.

For example, the network interface 6 conveys a cell received from terminal 18 to its associated send ring connection. The actual switching operation is executed by the switch 24 of the network interface 6, which interface conveys the cell stream received from the terminal 18, for example, to the send ring connection 30 of the network interface 6, after an evaluation of the Table in the path memory 44.

FIG. 5 shows an embodiment of a further local area network comprising 4 terminals 54 to 57 which exchange data over radio channels. The ellipse shown in FIG. 5 and connecting the terminals 54 to 57 is to denote the radio coverage area in which radio transmission is possible without any problems between two terminals (54 to 57).

A terminal 54 to 57 shown in FIG. 5, which comprises a station 58, a network interface 59 and a radio device 60, is shown in a more detailed form in FIG. 6. The station 58 may be, for example, a videophone, a Personal Computer, a workstation or a telephone. The network interface 59 comprises a controller 61 and a switching device 62 which is coupled to the radio device 60 via a send connection 63 and a receive connection 64 and switches cells generated in the asynchronous transfer mode.

Cells may be generated either by the controller 61, or the station 58 and be received over the radio link by the radio device 60. The controller 61, which may be arranged as a microprocessor, is used, for example, for setting up or disconnecting virtual links, for example, between two users of different terminals.

The switching device 62 further includes a switching unit 65, two path memories 66 and 67 and two receive circuits 68 and 69. The receive circuit 68 is connected to the receive connection 64, to an input of the switching unit 65 and to the path memory 66.

An output of the switching unit 65 is connected to the send connection 63. The receive circuit 69, which is coupled to the path memory 67, is inserted between an output connection 70 of the station 58 and a further input of the switching unit 65. An input connection 71 of the station 58 is further connected to a further output of the switching unit 65.

The headers of the cells coming in via the receiving connection 64 and the output connection 70 are evaluated in the receive circuits 68 and 69. Address information contained in the header is used for addressing various tables for the path memories 66 and 67 connected to the receive circuits 68 and 69. The data stored in the tables are used by the receive circuits 68 and 69 to organize the further processing and further transport of the cell. For example, the receive circuit 69 may copy a cell and provide it with new address information. The original cell is returned, for example, via the switching unit 65 to the radio device 60 and the copied cell via the switching unit 65 to the station 58. There is also the possibility that the switching unit 65 carries out functions such as this copy function. The receive circuit 68 transports cells received from the radio device 60 to the switching unit 65.

When a connection is set up, certain attributes, which are assigned to the connections featured by VPI and VCI, are stored in the tables of the path memories 66 and 67. As discussed above, an attribute, for example, for the type of connection, denotes a virtual connection.

The radio device 60 in a terminal 54 to 57 is formed by the same circuit elements as the radio devices 33 and 49 and comprises antenna 50, radio frequency circuit 51, modem 52 and protocol device 53 (FIG. 3).

The radio transmission between the terminals 54 to 57 may also take place according to a TDMA, FDMA or CDMA method (TDMA=Time Division Multiple Access; FDMA=Frequency Division Multiple Access; CDMA= Code Division Multiple Access). The methods may also be combined, as appropriate. For example, a time slot of a frame according to the TDMA method is assigned to a terminal for a specific connection. The duration of a time slot could be the duration of one or a plurality of cells and correspond to control and additional information for the radio transmission. For example, before a frame is transmitted, the assignment of a time slot for a connection is determined in dependence on the requirements of the respective terminal(s).

In the following there is supposed that the data exchange between the terminals 54 to 57 of FIG. 5 is effected according to the TDMA method (Time Division Multiple Access) over the radio path. For the transmission of data between two terminals (54 to 57), time slots are used which are assigned by the protocol belonging to the MAC layer (TDMA). A frame contains, like in the local area network shown in FIG. 1, a channel or time slot in which collisions occur (referenced registration channel in the following), a plurality of collision-free MAC signalling channels or time slots and transport channels or time slots for payload. Any terminal may access the registration channel, so that collisions with other terminals may occur. A terminal, once it has been switched on, allows itself to be registered via the registration channel with the terminal which performs the management function for the local area network. This terminal, whose controller 61 is responsible for the management, will be referenced management terminal hereinafter.

A MAC signalling channel is fixedly assigned to a terminal and is used for exchanging the MAC control information between the terminal and the management terminal. The MAC control information originates from the protocol belonging to the MAC layer and is used, for example, for dynamically reserving the transport time slots for the payload. The respective terminal then announces to the management terminal how many cells a buffer has available for transmission. The management terminal assigns, for example, in dependence on the buffer fill of cells available for transmission of the terminals located in the whole radio coverage area, the transport channels to the respective terminals. The assignment is then generally renewed prior to each new time frame. Also the assignment for all the transport channels may be effected dynamically. This means that for a first frame, more channels are assigned to the transmission from terminal 54 to terminal 56 than channels are assigned to the transmission from terminal 55 to terminal 54 and with another frame, more channels are assigned to the transport of cells from terminal 55 to terminal 54 than channels are assigned to the transmission from terminal 54 to terminal 56 by the management terminal.

In the local area network shown in FIG. 5, a decision may be made, for example, based on a dynamic algorithm distributed over the respective terminals 54 to 57, that the terminal 54 is the management terminal. During a frame, the management terminal may render for example, a first transport time slot or transport channel available to the terminal 55 for the transmission of data to the terminal 56, the second transport channel to the terminal 56 for the transmission of data to the terminal 55, the third transport channel again to the terminal 56 for the transmission of data to the terminal 54, the fourth transport channel to the terminal 54 for the transmission of data to terminal 57, the fifth transport channel to the terminal 57 for the transmission of data to the terminal 55 and so on. The management terminal, once it has received all the MAC signalling information, may carry out an optimization process for rendering an optimum number of transport channels available to each terminal on average.

The management terminal is further used for a connection set-up or a disconnection. Before a connection can be set up, a terminal is to be announced to the management terminal. A terminal then sends a registration request carrying the identity number (ID number) assigned to the terminal over the registration channel once the management terminal has been started. The request for registration, after it has been received in the radio device 60 of the management terminal is sent to the controller 61 after the path memory 66 has been polled. The management terminal stores the identification number of the terminal in, for example, a data bank coupled to the controller. The reception in the management terminal is acknowledged by means of an acknowledgement message sent to the terminal. The terminal is not only informed of the message about the assigned MAC signalling channel, but also of the acknowledgement message.

In the following will be described by way of example how a connection between two users of terminals is set up. The terminal 55, having a user $A_3$, would like to set up a connection to a user $A_4$ of the terminal 57. The management terminal is the terminal 54. In this context, the exchange of ATM cells (user and signalling cells) is assumed to be realized over the direct radio path between two terminals by means of MAC signalling. The circuit arrangements of the MAC layer make said dynamic time slot assignment possible, irrespective of the contents of the ATM cells.

The terminal 55 first generates and transmits signalling cells to the management terminal which signalling cells contain a request for a connection. The controller 61 of the management terminal receives signalling cells which contain a request for a connection and then verifies whether such a connection is possible (verifies whether, for example, terminal 57 is registered). When the connection is permitted, this virtual link is assigned a logical number in the form of VPI and VCI. Via signalling cells, the management terminal announces to the controller 61 of the terminals 55 and 57 that a virtual link has been set up. Prior thereto, the controller 61 of the management terminal has verified whether sufficient transmission capacity over the radio channel is available for the virtual link. A sufficient transmission capacity for a connection must on average be available for the radio channel. However, this capacity may vary from one frame to the next during the radio transmission. The controller 61 of the management terminal or circuits of the MAC layer is responsible for the dynamic time slot assignment during the radio transmission. When the connection is being set up, also the VPI and VCI for the connection for a certain transmission section in the network (for example, radio link) and for a section of the circuit (connections 70 and 71) are announced.

Tables in certain path memories are still to be changed in the network interfaces 59 of the terminals 55 and 57. A certain switch mode is set in the tables for the respective virtual link. This change in the tables is initiated via signalling cells which are sent by the management terminal and received and evaluated by the controllers 61 of the terminals 55 and 57. The actual change of the tables is made by the controller 61 of each network interface 59 in the terminals 55 and 57. Assigned VPI and VCI are then stored in the path memories 66 and 67.

For example, the network interface 59 of terminal conveys the cell transmitted from an assigned station 58 to the respective send connection 63 of the terminal. The actual switching operation is then carried out by the switching unit 65 of the switch 62, the latter accordingly conveying the received cell stream after evaluation of the table in the path memory 67.

As stated above, circuits forming the protocol device 53 (FIG. 4) of the radio device 33 (FIG. 2), or 60 (FIG. 6), carry out functions of the MAC and LLC layer. A circuit provided for the function of the LLC layer, which circuit will be referenced LLC circuit hereinafter, is shown in FIG. 7. The circuit comprises an evaluation circuit 72, a plurality of buffer memories 73 (first buffer memories), a latch 74, an LLC control circuit (first control circuit) for controlling the various circuit elements of the LLC circuit, and a table memory 76. The evaluation circuit 72 receives ATM cells from the network interface 23 (FIG. 2), or 59 (FIG. 6) and evaluates, for example, the header of the incoming cell to convey the cell. Additional information may also be added to the cell instead, which additional information is evaluated in the evaluation circuit 72 for transport purposes. In dependence on the evaluation of the cell, this cell is written into one or various defined buffer memories 73. The control information produced by the evaluation circuit 72 of the LLC control circuit 75 then leads to the LLC control circuit 75 releasing one or various defined buffer memories 73 for writing operations. The function of the buffer memories 73 can be carried out by a RAM memory (Random Access Memory) when respectively controlled by the LLC control circuit 75.

If the LLC circuit shown in FIG. 7 forms part of the radio device 33, and thus part of a local area network, with network interfaces 1 to 8 connected via a ring (FIG. 1), a total of (n+1) buffer memories are included in the LLC circuit. The variable n is equal to the number of terminals assigned to a network interface (1 to 8). n Buffer memories are thus provided for a unicast connection or a multicast connection. In the case of a multicast connection, a cell arriving at the evaluation circuit 72 is copied in accordance with the number of connections defined by the multicast connection, and written into the respective buffer memory. A further buffer memory is provided for cells of a broadcast connection.

The LLC circuit which is included in a radio device 49 of a terminal 9 to 21, has a buffer memory, because the connection to other terminals in the radio coverage area of the assigned network interface (1 to 8) and to terminals of other network interfaces (1 to 8) is effected via the assigned network interface. Furthermore, the LLC circuit of a terminal 9 to 21 includes the same circuit elements and functions as the LLC circuit shown in FIG. 7.

If the LLC circuit shown in FIG. 7 is included in a terminal 1 to 4 of a local area network shown in FIG. 5, a total of n buffer memories are available in such an LLC circuit. The variable n is equal to the number of terminals in the radio coverage area of the local area network shown in FIG. 5. (n−1) Buffer memories are thus used for buffering cells for a unicast or a multicast connection to (n−1) respective other terminals. In the case of a multicast connection, a cell arriving at evaluation circuit 72 is copied in accordance with the number of connections defined by the multicast connection, and written into the respective buffer memory. A further buffer memory is meant for buffering cells for a broadcast connection.

The reading of the cells from the respective buffer memories 73 is also controlled by the LLC circuit 75. The cells that have been read out are buffered in the latch 74. Cells are not buffered then, but the newly entered cells overwrite any available cells. A copy of the cell, however, continues to be in a buffer memory 73 until the proper reception has been acknowledged by the radio device (for example, 49) receiving the cell. A cell located in a buffer memory 73 is deleted by the LLC control circuit 75 when the proper reception has been acknowledged. A further delete operation is effected when the dwell time of the cell exceeds a predefined time-out. If the acknowledgement with respect to the reception of a cell is not received within a time-out adapted to the transmission rate, or if the reception of the cell has not been properly acknowledged within the time-out, the cell is retransmitted.

Furthermore, the LLC control circuit 75 sorts the cells in a buffer memory 73 when a cell has been produced by the evaluation circuit 72. Cells in a buffer memory may belong to various virtual links and thus have different, maximum permissible buffer times. A buffer time for a voice link is usually much shorter (or equal to zero) than a buffer time for a data link, for example, between two Personal Computers. The cells are sorted according to their residual lifetime. The residual lifetime is computed via the following formula by the LLC control circuit 75:

$$RL = ML - CT + AT$$

The variable RL corresponds to the residual lifetime, the variable ML corresponds to the maximum delay, the variable CT corresponds to the current time and the variable AT corresponds to the arrival time. The maximum delay is always longer than the buffer time. The cells are sorted as a function of the residual lifetime ie the cell having the shortest residual lifetime is the cell that is read first from the buffer memory 73. If a cell from a buffer memory 73 has been read out prior to the sorting, and an acknowledgement of the proper reception has not arrived yet, or the predefined waiting period for the acknowledgement has not yet elapsed, this cell is not included in the sorting process and is the cell which again is read out first.

Further parameters, such as a destination, a time-out and a maximum delay are assigned to each cell under the logical numbers of the virtual link (combination of VPI and VCI). When a virtual link is set up, these parameters can be transmitted to the LLC control circuit 75 over a further connection 77 which shows an interface between a network interface 23 or 59 and the LLC circuit, or by means of signalling cells. When the evaluation circuit 72 recognizes such signalling cells, they are directly transported to the LLC control circuit 75. The parameters received from the LLC control circuit 75 are stored under respective logical numbers of the virtual link in the table memory 76. Alternatively, it is possible for these parameters to be assigned to each individual cell in the respective buffer memories 73 as additional information. In that case, the table memory 76 may be omitted.

When a cell is stored in a buffer memory 73, also the parameters assigned to the respective cell, such as maximum delay, time-out and arrival time may be included, to make a faster access to the respective data possible. Similarly, it is possible to store the arrival time in the table memory or in another memory assigned to the LLC control circuit 75. It should be observed that the LLC control circuit 75 may be arranged as a microprocessor or signal processor which includes respective peripheral units.

As a rule, the cells are uniformly read out from the buffer memories 73. However, a plurality of buffer memories could be preferred during this reading operation.

The LLC circuit is thus provided for carrying out a flow and error control. A circuit coupled to the LLC circuit and used for the function of the MAC layer, which circuit will be referenced MAC circuit hereinafter, is shown in FIG. 8. As already observed, the MAC circuit makes it possible to have a collision-free multiple access to the radio transmission system. The cells coming from the latch 74 of the LLC circuit are applied to a further evaluation circuit 78 of the MAC circuit, which MAC circuit further includes a further (second) buffer memory 79, a further latch 80, a MAC control circuit 81 (second control circuit) for controlling the various circuit elements of the MAC circuit, and a further table memory 82. The cells received by the evaluation circuit 78 are written into the buffer memory 79 after being evaluated. Then, either the header of the cell or additional information added to the cell may be evaluated, as has already been explained with reference to the LLC circuit. The result of the evaluation is applied to the MAC control circuit 81 which controls the writing operation in the buffer memory 79. Once a cell has been written into the buffer memory 79, the MAC control circuit 81 sorts them as a function of their residual lifetime. The same computation is used here for the sorting of the cells in a buffer memory 73 by the LLC control circuit 75:

$$RL=ML-CT+AT.$$

The variable RL corresponds to the residual lifetime, the variable ML corresponds to the maximum delay, the variable CT corresponds to the current time and the variable AT corresponds to the arrival time. A cell which is just to be transmitted is discarded in the sorting process.

The MAC circuit, contrary to the LLC circuit, does not repeat a cell transmission. The second buffer memory 79 is only used for buffering the cells until a MAC controller allows a release for transmitting the respective cells. The MAC-MAC controller may either be the controller 40 or the MAC controller 81 when the MAC circuit is used in a network interface of the local area network shown in FIG. 1. With a terminal in a local area network shown in FIG. 5, the MAC controller is either the controller 61 or the MAC controller 81. In the latter case, the terminal is the management terminal.

The MAC circuit which is located in a radio device 49 of a terminal 9 to 21, also has a second buffer memory. A connection to the other terminal in the radio coverage area of the assigned network interface (1 to 8) and to terminals of other network interfaces (1 to 8) may be effected via the assigned network interface. The MAC circuit of the terminal 9 to 21 is similarly structured to the MAC circuit shown in FIG. 8. The MAC circuit of a radio device 49 receives a time slot assignment from the MAC controller of the assigned network interface.

A terminal of the local area network shown in FIG. 5, which terminal is not at the same time the management terminal, receives a time slot assignment from the MAC-MAC controller of the assigned management terminal. The MAC-MAC controller of a network interface shown in FIG. 1 and of the management terminal shown in FIG. 5 is naturally also suitable for the time slot assignment to the assigned (inherent) MAC circuit when the latter intends to transmit cells itself.

In the table memory 82, two parameters are stored under the logical numbers (VPI and VCI) of a virtual link. This is the destination of the cell and the maximum permissible dwell time. When a call is set up, these parameters may be applied either by means of signalling cells via the evaluation circuit 78, or via a link 83 between MAC control circuit 81 and network interface 23 or 59 of the MAC control circuit 81. The parameters are stored in the table memory 82. The parameters may also be supplied as additional information together with the assigned cell via the evaluation circuit 78 and stored in the buffer memory 79. In that case, the table memory 82 may be omitted. Furthermore, further parameters such as, for example, the arrival time may be stored as additional information.

A dynamic time slot assignment is effected in the MAC circuit. The MAC control circuit 81 then informs the assigned MAC control device of how many cells are stored in the second buffer memory 79 and for what destination. The MAC control device optimizes the cells which the various terminals desire to be transmitted and then assigns time slots of a certain frame to the respective terminals. Once at least one time slot has been assigned, the number of time slots and cells corresponding to the duration of a time slot are read from the buffer memory 79 at the assigned instant of the frame and supplied to the modem 52.

What is claimed is:

1. A local area network operating in the asynchronous transfer mode, with a first transceiver (1 to 8, 54 to 57), which transceiver includes a radio device (33, 60) for transmitting cells to a plurality of other transceivers (1 to 21, 54 to 57), characterized in that the radio device (49, 60) includes first buffer memories assigned to another transceiver (1 to 21, 54 to 57) and in that a first buffer memory stores a cell whose destination is another transceiver (1 to 21, 54 to 57) which is assigned to the respective first buffer memory (73).

2. The local area network as claimed in claim 1, characterized in that the radio device (49, 60) comprises a first controller (75) which is used for deleting a cell in a first buffer memory (73) after an assigned receiver device (1 to 21, 54 to 57) has acknowledged a proper reception.

3. A local area network as claimed in claim 2, characterized in that after a cell has been written into a first buffer memory (73), the first controller (75) is used for sorting the cells in the respective first buffer memory (73) in dependence on the residual lifetime, in that the first controller (75) is used for computing the residual lifetime of a cell by subtracting the instant at which the computation takes place and adding the instant at which the storage of the predefined maximum dwell time takes place and in that the first controller (75) is used for releasing the reading of the cell that has the shortest residual lifetime from a first buffer memory (73).

4. The local area network as claimed in claim 3, characterized in that the first controller (75) is not used for sorting such cells for which an acknowledgement of the reception within a time-out has not yet arrived after the cells have been read from a first buffer memory (73), or when the waiting period for an acknowledgement has not yet elapsed.

5. The local area network as claimed in claim 4, characterized in that a second buffer memory (79) is used for receiving a cell read from a first buffer memory (73) and in that a second controller (81) is used for sorting the cells buffered in the second buffer memory (79) as a function of the residual lifetime.

6. The local area network as claimed in claim 5, characterized in that the second controller (81) is used for counting the cells to be transmitted to a transceiver (1 to 21, 54 to 57) and for transporting them to a control device (1 to 8, 54 to 57), and in that the control device (1 to 8, 54 to 57) is used for assigning the number of cells which are to be transmitted to a specific transceiver (1 to 21, 54 to 57).

7. The local area network as claimed in claim 1, characterized in that the transceivers (54 to 57) form each a terminal comprising a station (58) and a network interface (59), which network interface (59) comprises a controller (61) provided at least for the connection set-up and a switching device (62) for switching cells between radio device (60), station (58) and controller (61), and in that the terminals (54 to 57) are used for directly exchanging data with another terminal (54 to 57).

8. The local area network as claimed in claim 1, characterized in that a plurality of transceivers are arranged as network interfaces (1 to 8) which are coupled with a plurality of other network interfaces (1 to 8) to a ring, in that a network interface (1 to 8, 23) comprises a controller (40) provided at least for setting up the connection and a switching device (24) for switching cells between ring connections (29 to 32), a radio device (33) and a controller (40), and in that other transceivers (9 to 21) form each a terminal which is used for exchanging data with a network interface (1 to 8).

9. A radio device (33, 60) of a first transceiver (1 to 8, 54 to 57) in a local area network operating in the asynchronous transfer mode, for transmitting cells to a plurality of other transceivers (1 to 21, 54 to 57), characterized in that the radio device (49, 60) comprises a first buffer memory (73) assigned to a respective other transceiver (1 to 21, 54 to 57) and in that a first buffer memory (73) is used for storing a cell whose destination is another transceiver (1 to 21, 54 to 57) which is assigned to the respective first buffer memory (73).

* * * * *